United States Patent [19]

Siegel

[11] 4,065,790
[45] Dec. 27, 1977

[54] VIDEO PROCESSING AMPLIFIER PROVIDING BLACK LEVEL CORRECTION

[76] Inventor: Eric Siegel, 301 100 St., Brooklyn, N.Y. 11209

[21] Appl. No.: 742,661

[22] Filed: Nov. 17, 1976

[51] Int. Cl.$^2$ ............................................. H04N 5/18
[52] U.S. Cl. .................................................. 358/172
[58] Field of Search ........................ 358/171, 172, 170

[56] References Cited

U.S. PATENT DOCUMENTS 3,819,859   6/1974   Borsuk et al. .................... 358/172 X Primary Examiner—Robert L. Richardson
Attorney, Agent, or Firm—Hubbell, Cohen, Stiefel & Gross

[57] ABSTRACT

An improved video processing amplifier includes means for correcting for any black level distortion present in a composite video signal input for restoring the black level to a substantially undistorted video signal black level. The composite blanking and sync signals are removed from the composite video signal input prior to black level distortion correction and restoration. A window signal positionable in a central area of the associated video picture producable from the composite video signal input is provided to accomplish black level distortion correction and restoration, with this window signal being used to key a keyed clamp DC restoration circuit ON during the central area of the associated video picture information. Image enhancement is provided in the resultant output composite video signal in a single transistor state. In addition, both white and black peak level clipping is provided in a common clipping amplifier stage based on the saturation characteristics thereof.

15 Claims, 8 Drawing Figures (LEFT SIDE)

(RIGHT SIDE)

VIDEO PROCESSING AMPLIFIER PROVIDING BLACK LEVEL CORRECTION

BACKGROUND OF THE INVENTION

1. Field of the invention

The present invention relates to video processing amplifiers and improvements therein.

2. Description of the Prior Art

Video processing amplifiers for removing unwanted elements from the video signal, and improving the picture quality are well known, such as described in "Introduction to Solid-State Television Systems," Gerald L. Hansen, Prentice-Hall, Inc., 1969, pages 117 through 143. Such video processing amplifiers vary both in relative size and complexity according to the applications for which the camera system and/or video tape editing system is designed. Broadcasters, for example, are much more concerned about the quality of their presentation than a user who employs television cameras for simple surveillance. The broadcaster, therefore, uses more elaborate means to condition the signal prior to transmission, and the video processing amplifier circuitry is usually quite elaborate. Simple camera systems, on the other hand, normally employ a relatively small number of stages to refine the signal. Moreover, the order in which the video processing functions are performed varies with the prior art camera system being utilized, although the objectives are always the same; namely the aforementioned removal of unwanted elements from the signal and the improvement in picture quality.

In such prior art video processing amplifiers, black level distortion correction and restoration is desirable. However, in such systems known to the Inventor herein, there are numerous occasions due to the conventional dark current associated with conventional vidicon tubes when it is not desirable to reference black to the back porch of horizontal blanking as would be conventionally accomplished with conventional prior art keyed clamp DC restorers; rather it would be most preferable to reference black to the blackest point in the video signal. If, in order to accomplish this, a conventional diode were utilized, such diode would be clamping to the sync pulses since that would be the blackest portion of the video signal or, similarly, if such sync pulses were not present, then the diode would be clamping to the blanking signal because that would still be the blackest point present in the video signal. This solution, however, is not satisfactory for providing automatic black restoration or automatic black correction for preferably correcting any black level distortion present in the video signal. Moreover, prior art video processing amplifiers known to the Inventor herein require complex image enhancement circuitry as well as other complex and often redundant circuitry in processing the composite video signal input so as to remove various unwanted elements from the signal and improve the picture quality. These disadvantages of the prior art are overcome by the present invention.

SUMMARY OF THE INVENTION

In a video processing amplifier having means for receiving a composite video signal input having predetermined video signal characteristics including black level, composite sync and composite blanking signals, and means for correcting for any black level distortion present in said composite video signal input for restoring said black level to a substantially undistorted video signal black level, the composite sync signals comprising horizontal and vertical sync and the composite blanking signal comprising horizontal and vertical blanking signals; the improvement comprises means operatively connected between the composite video input signal receiving means and the black level restoration means for removing the sync and blanking signals from the composite video signal input prior to black level distortion correction and restoration and the black level distortion correction and restoration means comprises means for providing a window signal positionable in a central area of the associated video picture producible from the composite video signal input for providing an output composite video signal having black level restoration. The window signal, which comprises a window pulse having an associated positive polarity, has an associated width greater than an associated width of the vertical blanking signal and an associated width of the horizontal blanking signal by a predetermined amount, such predetermined amount providing a guard band about the window signal for preventing the video processing amplifier from black level sampling of any portion of the composite blanking signal. Keyed clamp DC restoration means are operatively connected to the window signal providing means for receiving the window pulse positive polarity and for keying the keyed clamp DC restoration means ON during the central area for the associated video picture information while the positive polarity of the window pulse is present for sampling the composite video signal input and clamping the blackest negative excursions of the composite video signal input to a predetermined positive voltage level, whereby the video processing amplifier provides an output composite video signal having black level restoration. Video image enhancement is also preferably provided in a single transistor stage in conjunction with an R-L network and feedback potentiometer for providing a white ring both before and after each black bar present in the picture to enhance the associated image thereof. In addition, non-additive mixing of the enhanced image signal and an external title camera input are provided. Furthermore, both black and white peak level clipping are provided in a common transistor amplifier stage based on the saturation characteristics thereof, such as from the collector to the emitter.

DETAILED DESCRIPTION OF THE PREFERRED EMBODIMENT

Figure 1:
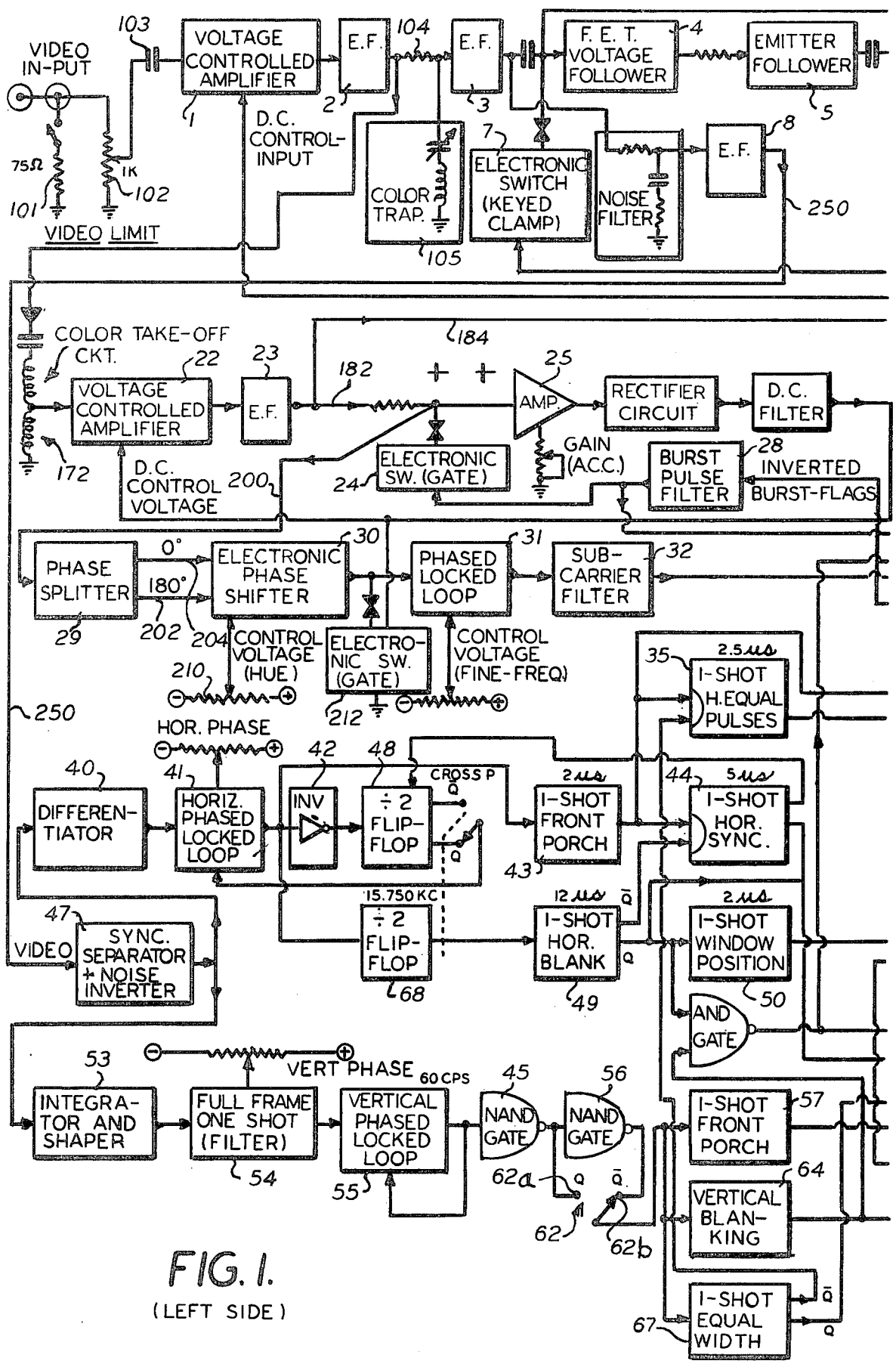
FIG. 1 is a functional block diagram, partially in schematic, of the preferred improved video processing amplifier in accordance with the present invention.
Figure 1:
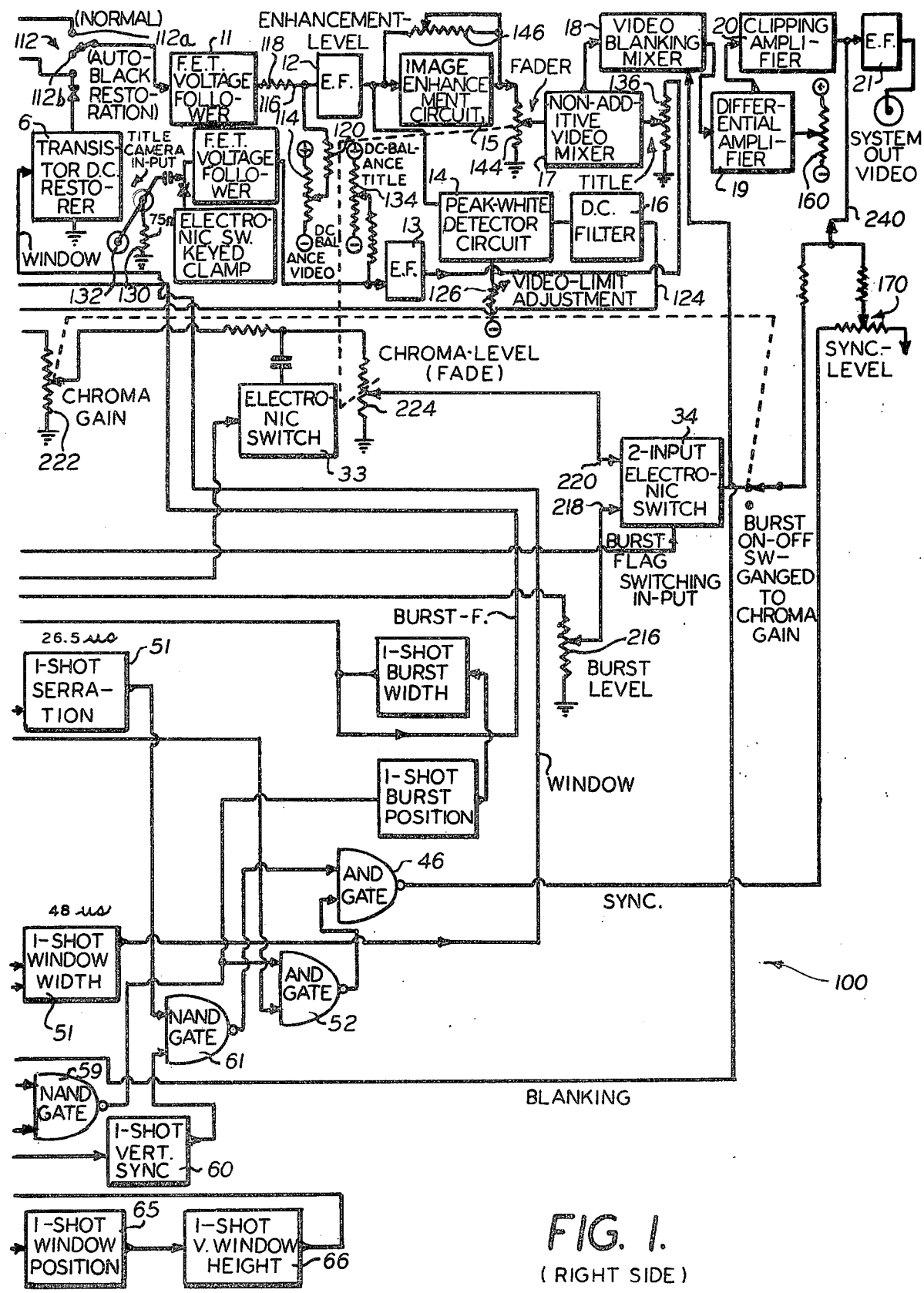
Figure 2A:
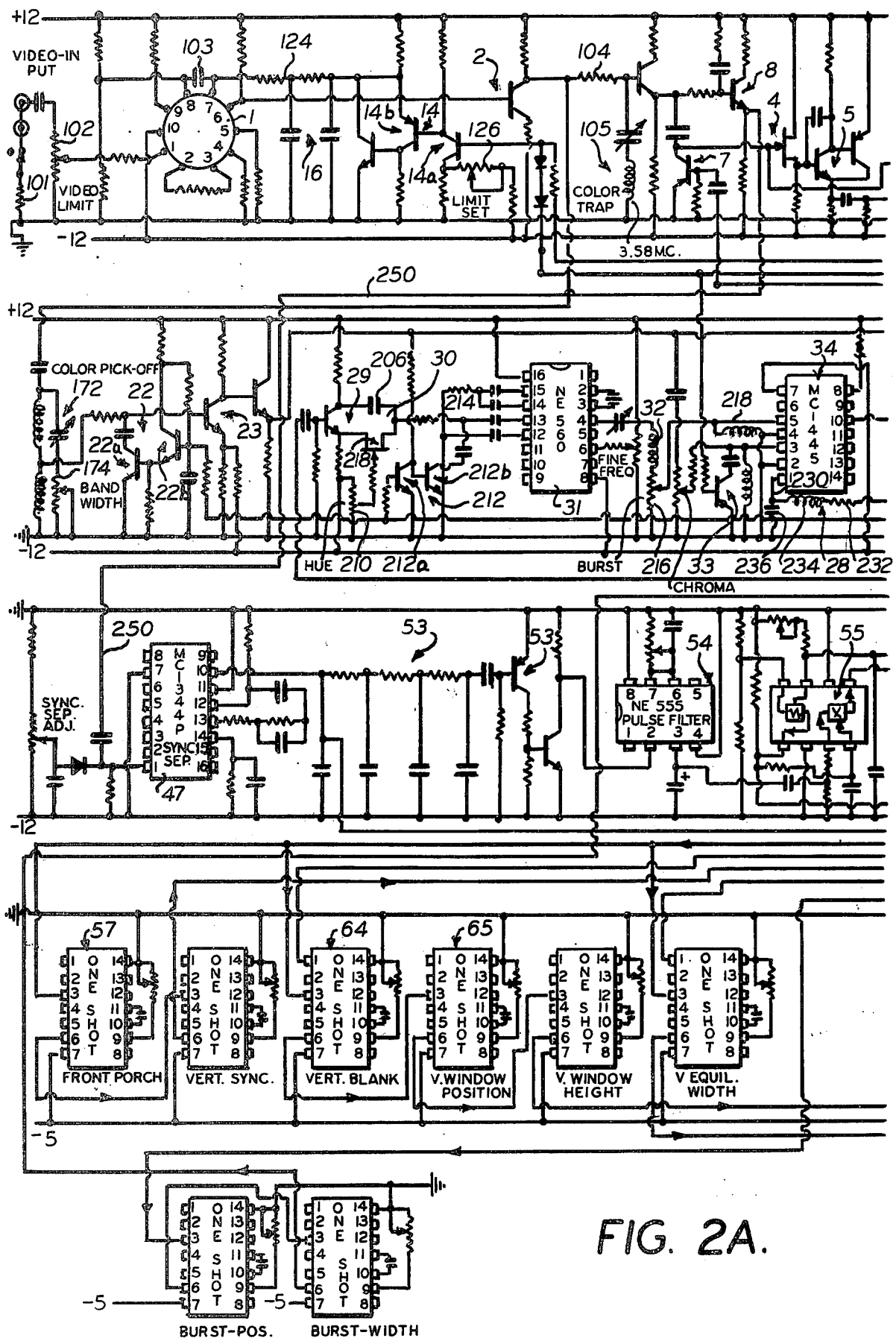
FIGS. 2A and 2B, taken together, comprise a schematic diagram, partially in block, of the improved video processing amplifier of FIG. 1.
Figure 2B:
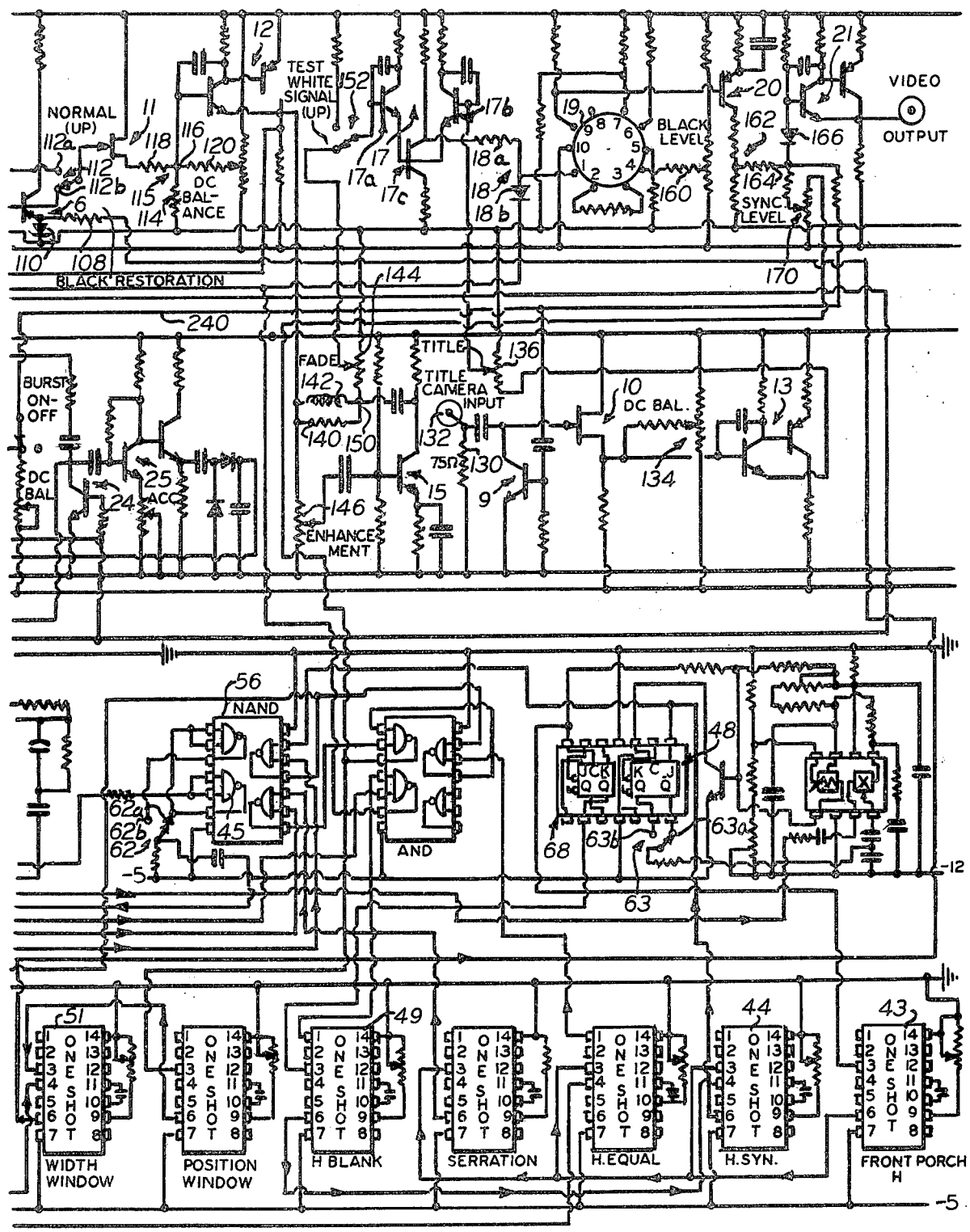

Referring now to the drawings in detail, and particularly to FIGS. 1, 2A and 2B thereof, the preferred video processing amplifier, generally referred to by the reference numeral 100, of the present invention is shown. Video processing amplifier 100 preferably includes a conventional voltage controlled amplifier 1, which is preferably located in a DC servo loop to be described in greater detail hereinafter. A conventional video input signal to video processing amplifier 100 is preferably provided to the input of amplifier 1 through a switch 101 that conventionally determines whether the input line is terminated 75 ohms or not, and therefrom through a conventional potentiometer 102 and DC blocking capacitor 103. Input potentiometer 102 is conventionally termed the "video input" potentiometer because as the associated impedance of potentiometer 102 is increased, a level will be reached at which the voltage controlled amplifier 1 will take over and stop the input signal from going any higher so as to prevent any kind of distortion. As shown and preferred in FIGS. 2A and 2B taken together, the video input signal, is by way of example, accordingly provided to a conventional double balanced modulator chip acting as a voltage controlled amplifier 1, with the carrier input thereof being utilized as the DC voltage controlled input to vary the gain of the amplifier 1. In such an instance, the video input signal is preferably provided to the modulation inputs of the double balanced modulator 1 and the DC is conventionally used to control the amplification of this amplifier 1 on the carrier input. The balance of the associated circuitry for modulator or voltage controlled amplifier 1 in FIGS. 2A and 2B is conventional and is conventionally utilized to set the DC characteristics of the double balanced modulator or amplifier 1 so that linear results are achieved. The output from this double balanced modulator 1 is preferably a relatively high impedance and, accordingly, any circuitry that would be connected to the output thereof would normally have a distorting effect on it and reduce the frequency response. In order to prevent this, the output of the double balanced modulator 1 is provided to a conventional emitter follower circuit 2 (FIGS. 2A–2B), such as to the base of a PNP emitter follower transistor 2. The output of this emitter follower 2 is preferably utilized to feed associated color circuitry, to be described in greater detail hereinafter, because color preferably is allowed to pass through the video processing amplifier 100, at least until emitter follower 2. After this input signal passes through emitter follower 2, it is preferably provided through a resistor 104 to a conventional color trap circuit 105 which conventionally removes all color information from the video signal which is then subsequently provided to the balance of the preferred video processing amplifier 100. This output signal of color trap 105, having the color information removed therefrom, is preferably provided to another conventional emitter follower 3, and is a monochrome video signal which preferably contains the full spectrum of information contained in the video input signal except that there is a sharp cut out at the color frequency. Higher frequencies than color will preferably pass through this circuit 104-105-3 so that high resolution video systems will not be disturbed and will have their normal associated full resolution with the exception that the normally thin band associated with the conventional color spectrum will be filtered out due to color trap 105.

This monochrome video signal which is present at the output of emitter follower 3 is preferably now ready for the preferred DC processing. Accordingly, it is fed to a conventional line-to-line clamp 7 (FIGS. 2A–2B), the output of which is fed into a conventional FET source follower 4 or voltage follower. The output of the source follower 4 is, in turn, preferably fed to a conventional low impedance emitter follower circuit 5 which prepares the signal being processed for the preferred automatic black restoration which preferably corrects any black level distortion, as will be described in greater detail hereinafter. Conventional restoration in DC prior art video equipment is conventionally accomplished by a keyed clamp DC restorer which is also present in the preferred video processing amplifier 100 as previously described. However, there are numerous occasions due to the conventional dark current associated with conventional vidicon tubes when it is not desirable to reference black to the back porch of horizontal blanking as would be conventionally accomplished with conventional keyed clamp DC restorers; rather, it would be most preferable to reference black to the blackest point present in the video signal. If, in order to accomplish this, a conventional diode were utilized, such diode would be clamping to the sync pulses since that would be the blackest portion of the video signal or, similarly, if such sync pulses were not present, then the diode would be clamping to the blanking signal because that would still be the blackest point present in the video signal. This solution, however, is not satisfactory for providing automatic black restoration or automatic black correction for preferably correcting any black level distortion present in the video signal. In order to accomplish such preferred automatic black restoration in the preferred video processing amplifier 100 of the present invention, preferably both the sync and blanking signals and everything close to them is removed to insure that what is being sampled or clamped to is the actual blackest portions in the picture and not the blanking or sync signals. As will be explained in greater detail hereinafter, in order to accomplish the presently preferred automatic black restoration, a new form of inverse blanking is created which has a wider width than the vertical or horizontal blanking signal, with this extra width preferably acting as a guard band to insure that the amplifier 100 will never be sampling to any portion of a blanking signal. This newly created signal is termed "the window" herein because, in fact, it uses the central area of the picture as the sampling area to sample for the blackest point in that area of the picture.

Figure 3A:
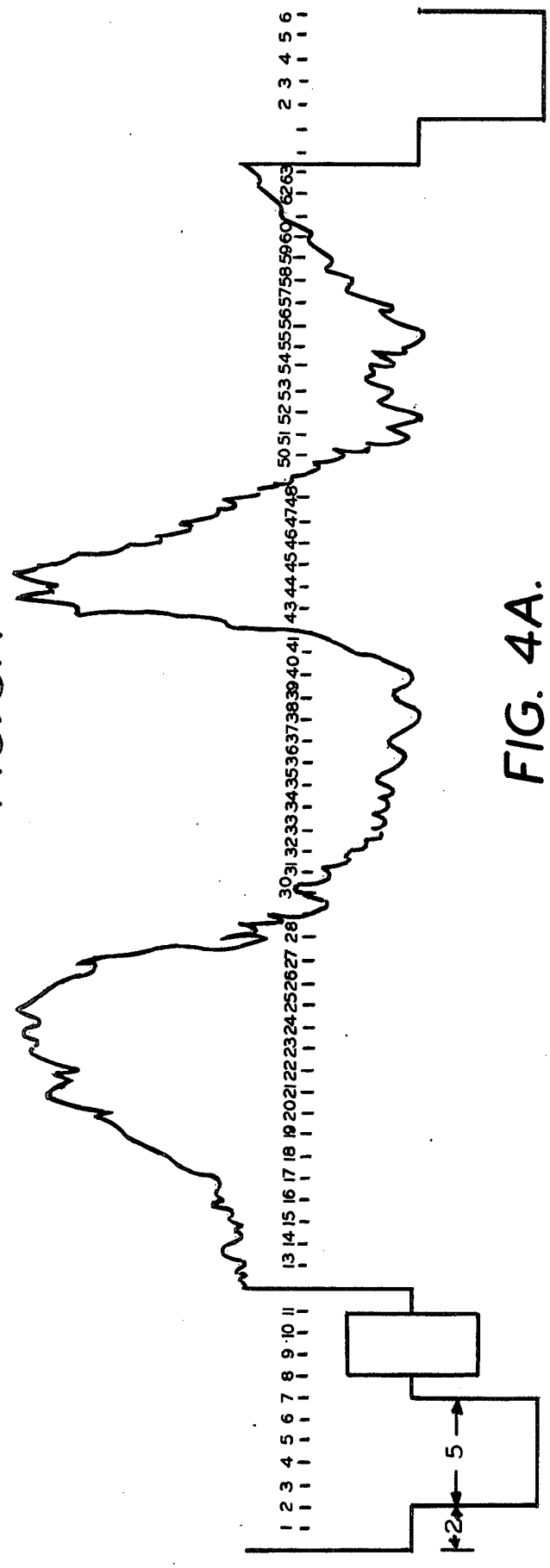
FIGS. 3A and 3B are graphic illustrations of the window signal provided in the improved video processing amplifier of FIGS. 1, 2A and 2B.
Figure 4A:
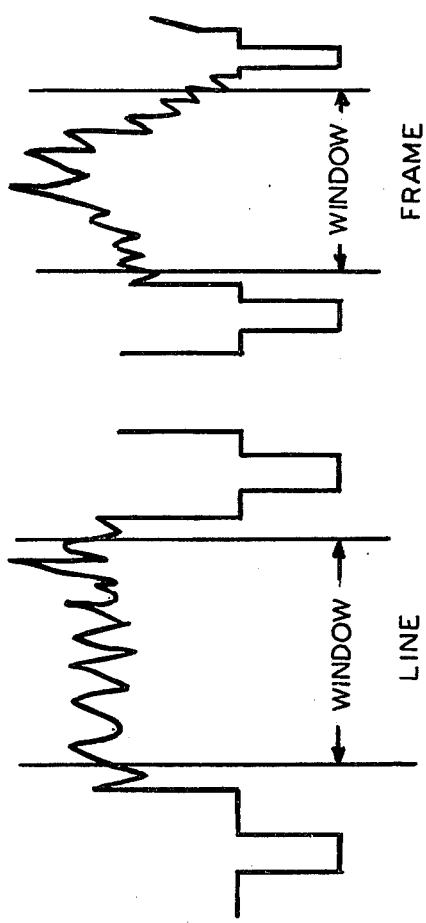
FIG. 4A is a graphic illustration, similar to FIG. 3A, of the relative position of the window signal of FIGS. 3A and 3B in the composite video signal.
Figure 3B:
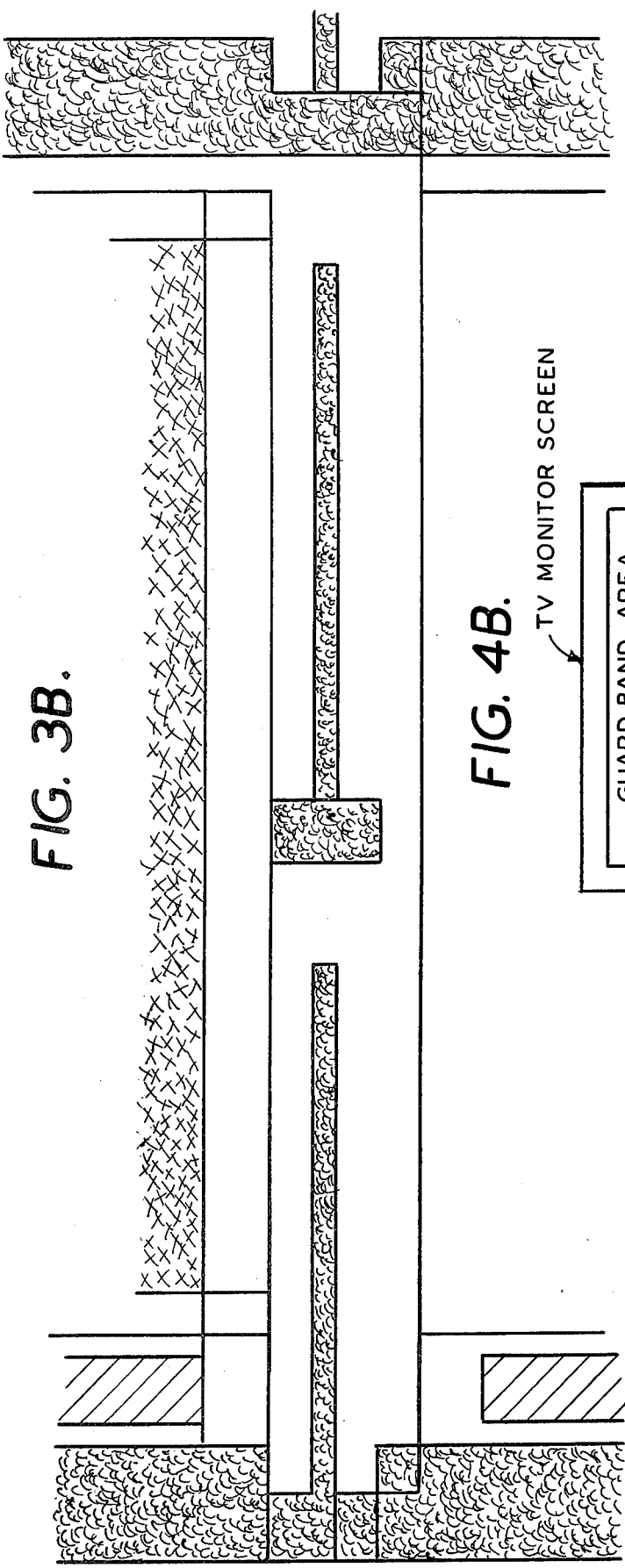
Figure 4B:
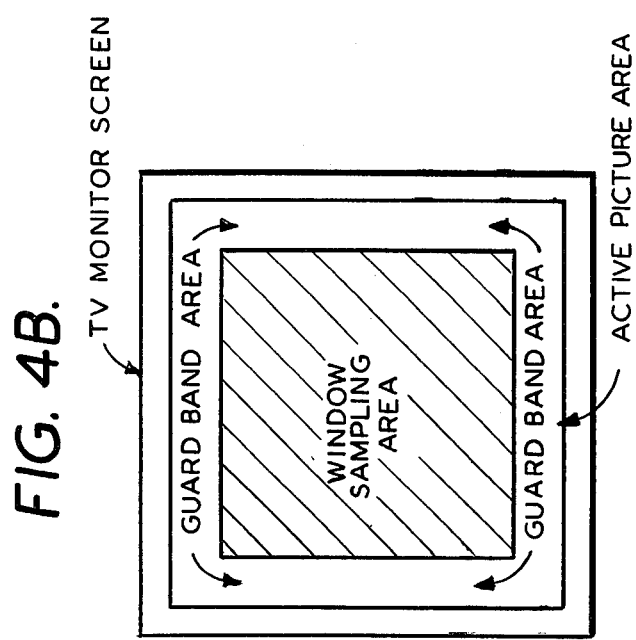
FIG. 4B is a diagrammatic illustration of the relative position of the window signal of FIGS. 3A, 3B and 4A as it would appear on a television monitor screen.

Referring now to FIGS. 3A and 3B, and particularly to FIG. 3B, it can be seen how this "window" is positioned. This "window" signal is preferably created in the following manner. Video processing amplifier 100 preferably includes a vertical blanking one-shot circuit 64. The trailing edge of the vertical blanking signal is preferably utilized as the trigger for a conventional one-shot 65 which preferably determines the position of the vertical window. The output of this position one-shot 65 preferably triggers another conventional one-shot 66 which preferably determines the height of the vertical window. Preferably, the same operation is accomplished with respect to the horizontal, amplifier 100 preferably including a horizontal blanking output circuit 49 which preferably provides a trigger signal to a conventional one-shot horizontal window position circuit 50 which determines the starting point of the horizontal or the width of the window, the output of one-shot 50, in turn, triggering another conventional horizontal window one-shot or window width one-shot circuit 51. The output of the vertical window height one-shot 66 is preferably fed as another input to the window width one-shot circuit 51, in order to thus take advantage of an AND gating action. The resultant signal output in a "square box" located in the normally central active area of video as seen on a monitor, as illustratively shown in FIG. 3B. Preferably the positive polarity of this window pulse is fed through a resistor 108 to a transistor keyed DC restorer 6 which is preferably similar to a conventional keyed clamped DC restorer which is triggered ON only during the back porch horizontal blanking except it differs therefrom in that keyed clamp DC restorer 6 is instead preferably keyed ON during the central active area of video information. Accordingly, the transistor comprising black restoration circuit 6 is preferably used as a diode and that diode is keyed ON to conduct during the central active area of video information and, accordingly, the blackest or the most negative swings of the video signal are preferably clamped to +0.6 volts, by way of example. Preferably, a diode 110 is connected to the emitter of DC restorer 6 which thus forms the second diode in the keyed clamp arrangement. Thus, the other transistor of DC restorer 6 acts like another diode with the two equivalent associated anodes back-to-back and, accordingly, when a positive pulse is fed into this junction it keys these diodes into conduction. Since the video is preferably fed to the equivalent of the cathode end of the second diode, it accordingly clamps the negative excursions of the video signal to +0.6 volts, by way of example.

As shown and preferred in FIGS. 1, 2A and 2B, amplifier 100 includes a two position black restoration switch 112 having a normal position 112a in which the video is thereby obtained from a line-to-line standard video clamp. In this position 112a, the automatic black restoration circuit 6 will be bypassed and the amplifier 100 will preferably follow the exact black level of an incoming video tape, tracking it exactly the way it originally was. However, on those video tapes that may have the vidicon dark current error, switch 112 is preferably switched to position 112b to provide the aforementioned automatic black restoration via DC restorer 6, the video signal passing through the automatic black restoration circuit 6 in this position 112b. The output of this switch 112 preferably feeds into a conventional FET voltage follower 11 with the FET 11 preferably being used to prevent a very high impedance so that there is no loading of the aforementioned DC and black level restoration circuits, these circuits normally requiring a very high loading impedance. Since field effect transistors (FETs) normally have different temperature and manufacturing characteristics, a DC balanced trim potentiometer 115 is preferably utilized in conjunction therewith. The output of this DC balance circuit 115 is taken from the junction point 116 of resistors 114, 118, 120 between FET voltage follower circuit 11 and a conventional very low impedance emitter follower circuit 12 which preferably consists of an NPN and PNP transistor in a conventional feedback arrangement. The resulting output signal from emitter follower circuit 12 is termed the pre-processed video signal.

This pre-processed video signal output of circuit 12 is then preferably utilized for the operation of an automatic video limiting or peak-white circuit 14, as will be described in greater detail hereinafter, black preferably being equal to 0 volts DC, by way of example, and white preferably being equal to +0.7 volts, by way of example, in this pre-processed video signal output.

These exemplary values are preferably chosen since the forward conductance of a conventional NPN transistor is approximately +0.6 volts. Accordingly, the preferred peak-white detector circuit 14 preferably comprises a conventional NPN transistor 14a whose base is connected to the pre-processed video signal output of emitter follower circuit 12 through a conventional current dropping resistor so that whenever the white peaks of this pre-processed video signal go above this exemplary +0.6 or +0.7 volts value, a pulse will preferably appear at the collector of the peak-white detector transistor 14a with this pulse preferably then being fed into another conventional low impedance emitter follower circuit 14b also contained in the preferred peak-white detector circuit 14. These white peak pulses are then preferably fed from this very low impedance source 14b into a conventional DC capacitive filter circuit 16 which preferably holds these pulses and converts them into fluctuating DC voltages, filter 16 preferably holding these pulses for approximately one second, by way of example. This fluctuating DC voltage output of filter 16 preferably becomes the DC control voltage input to voltage controlled amplifier 1 via path 124.

Referring one again to peak-white detector circuit 14, the emitter circuit of transistor 14a preferably includes a potentiometer 126 to control the DC voltage on the emitter so that the video limit point when the amplifier 100 will start to limit the video signal can be precisely adjusted to the desired limiting voltage value, this characteristic being termed "limit set." Preferably, by way of example, the limit set potentiometer 126 is adjusted to insure that the video signal does not exceed +0.7 volts. This "limit set" is in addition to the aforementioned video limit potentiometer 102 at the video input to amplifier 100, which input video limit 102 merely acts as a gain control, which, if adjusted too high, will cause the aforementioned automatic limiting circuitry to control the video limit function. This arrangement is different than that utilized for conventional automatic gain control in that it will only bring down the signal's level, it will never bring this signal level up. In order to bring this signal level up, preferably the video control must be manually turned. Thus, it achieves a much more pleasing, aesthetic look to the resultant picture output associated with amplifier 100 because accordingly, no gain and, hence no distortion is brought up.

The video processing amplifier 100 of the present invention also preferably includes another conventional FET voltage follower 10 which is associated with a title camera input to the amplifier 100, this input also preferably having a termination resistor 130, such as 75 ohms, similar to input resistor 101, with resistor 130 not being switched, however, since the title camera (not shown) would preferably be connected directly to the processing amplifier 100, the title camera being the type that is normally utilized with a conventional video backpack, by way of example, and connectable to the amplifier 100 through a conventional camera connector 132. Thus, the preferred video processing amplifier 100 may also be utilized as a switcher/fader or a master production unit for users who desire to get their editing finished without having to employ elaborate equipment to get a "clean" signal. By use of the aforementioned title camera input, a camera can be focused on titles and these titles can be non-additively mixed during editing to facilitate simplicity in preparing edited video tapes. This title signal preferably passes through a conventional line-to-line clamp circuit 9, and is then fed into the FET voltage follower 10, which also preferably includes a DC balanced potentiometer 134 whose output is provided to another conventional emitter follower circuit 13. The output of emitter follower 13 is, in turn, preferably fed through another potentiometer 136 to one input of a conventional non-additive video mixer 17.

Video processing amplifier 100 also preferably includes an image enhancement circuit 15 which receives as an input thereto a pre-processed video signal output of emitter follower 12 which, as was previously mentioned, is also provided to the peak-white detector circuit 14. The output of image enhancement circuit 15 is preferably provided in parallel along two paths, one path being through a resistor-inductor (R-L) combination 140-142 to a fader potentiometer 144 which provides another input to the non-additive video mixer 17, and the other path being a feedback path through an image enhancement lead potentiometer 146. The full frequency response signal preferably passes across the R-L arrangement 140-142 to the wiper arm of the fader potentiometer 144, with this R-L arrangement 140-142 preferably presenting a high impedance at the upper end of the fader potentiometer 144 for high frequency signals only. Thus, the video signal which is preferably amplified by image enhancement or amplifying circuit 15, and which is also preferably inverted, is preferably fed back to the opposite end of the inductor 142 so that only the high frequency components of the signal are added to the video signal in such a way that when a black bar is present in the picture, a white ring will be provided both before and after that black bar. When this type of white ring is introduced into a video signal both before and after the origination signal, this provides "image enhancement." Accordingly, image enhancement circuit 15 provides a simple transistor image enhancer which has a very wide range of enhancement capabilities. The output of this simple image enhancement circuit 15 is preferably present at point 150 which is connected to the hot side of the video fading potentiometer 144. As was previously mentioned, this fade signal and the aforementioned title signal are both fed as inputs to non-additive video mixer 17 which preferably comprises two conventional emitter followers 17a and 17b which are preferably tied together to provide a conventional type of differential mixing circuit that is balanced so that these two input signal voltages will never add, this being characteristic of a non-additive circuit. Video mixer 17, as shown and preferred, also preferably includes a third conventional emitter follower 17c, transistor 17c preferably being the opposite type of transistor to transistors 17a and 17b. Thus, by way of example, mixing transistors 17a and 17b are NPN transistors while transistor 17c is a PNP transistor. Accordingly, absolute temperature stability is provided for video mixer 17 since when a temperature change causes the DC level of the video signal to go up or down doe to leakage currents in the NPN transistors 17a and 17b, this would be nullified by the opposite occurrence in the PNP transistor 17c. Thus, video mixer 17 is a non-additive transistorized video mixing circuit which is both temperature compensated and temperature stable.

As further shown and preferred in FIGS. 2A-2B, a switch 152 is provided which enables the testing of the white signal when the switch 152 is in the up position to, thus, provide a test white signal output from the processing amplifier 100 for setting up video tape recorders for maximum deviation (100% maximum video output). When this switch 152 is in the down position as shown in FIGS. 2A-2B, it is preferably connected to the wiper arm of the fader potentiometer 144.

The output of the non-additive video mixing circuit 17 is preferably provided to a video blanking mixer circuit 18 which, as will be described in greater detail hereinafter, is the mixing circuit which adds fresh new blanking to the video signal. Video blanking mixer 18, as shown and preferred in FIGS. 2A-2B preferably comprises a resistor 18a which preferably provides a voltage drop across it and a diode 18b that is preferably connected to reconstituted video blanking and pulls down the entire signal during blanking intervals to, by way of example, a negative voltage of −5 volts. Thus, the full video signal is present which, by way of example, is a peak-to-peak signal of 0.7 volts, plus a sharp blanking pull down of, by way of example, about −5 volts. This signal is preferably fed into another conventional double balanced modulator 19 which is preferably employed as a differential amplifier. The other input to this differential amplifier 19 is preferably connected to a potentiometer 160 which enables selection of the 0 level point by variation of the potentiometer 160. The output of this differential amplifier 19 is preferably provided to a conventional clipping amplifier 20 which preferably comprises a transistor which is tied from supply to ground and which has a voltage, by way of example, of about 10 volts, so that clipping of white and black can be achieved by the saturation characteristics of the transistor circuit from collector to emitter, the peak-to-peak voltage for transistor 20 being, by way of example, a video signal of approximately 10 volts peak-to-peak saturated, with anything above that being white and black saturated. Thus, clipping amplifier 20 preferably sets the upper and lower limits of the video signal. Preferably, the aforementioned peak-to-peak signal, which is 10 volts by way of example, is converted down to a 0 to 0.7 volt peak-to-peak signal, by way of example, by a conventional resistor-divider network 162 in the collector circuit of transistor 20. The output of divider network 162 is preferably fed, in turn, to a conventional resistor-diode combination 166, being provided thereto to obtain a predetermined bias voltage, such as +0.6 volts, which is provided to the base of another conventional emitter follower 21 at the output of amplifier 100 in order to preferably provide exact DC compensation so that the video output signal will correspond to black being a predetermined value of, by way of example, zero volts and white being a predetermined value of, by way of example, +0.7 volts. The aforementioned divider network 162 is also preferably the point in amplifier 100 where sync is added, which is preferably a pulse of, by way of example, 0 to −0.25 volts polarity, with the sync level being variable by a potentiometer 170, and where the chroma is added, chroma preferably being added at the very end of the processing of monochrome video.

Now describing the color circuitry portion of video processing amplifier 100, this portion preferably includes another conventional DC voltage controlled amplifier 22 which preferably receives an input signal thereto from a conventional color tuned resonance circuit or color take-off circuit 172, which is preferably tuned to the conventional color subcarrier frequency of 3.58 megahertz, with the Q of that circuit 172 preferably being controlled by a potentiometer 174 which is band pass and is adjustable to provide the exact bandwidth characteristics required for the best color reproduction.

The chroma signal is preferably picked off from the output of the DC voltage controlled amplifier 1, with amplifier 1 preferably bringing the monochrome signal up to the proper level. Accordingly, the video processing amplifier 100 takes advantage of this by taking the color signal after it has gone through this stage 1 of compensation so that the closest relationship of chroma level can be achieved. Thus, the chrominance pick off is preferably accomplished after it has gone through the DC voltage control amplifier circuit 1 emitter follower 2, as shown and preferred in FIGS. 1 and 2A-2B.

Preferably, after his chrominance pickoff signal passes through DC voltage controlled amplifier 22, it is fed to another conventional emitter follower circuit 23. As shown and preferred, in FIGS. 2A-2B, amplifier 22 comprises a pair of transistors 22a and 22b, with the circuit 22 preferably being arranged to utilize transistors 22a and 22b as variable resistors due to the change in collector resistance which occurs as the DC voltage on the base changes. Accordingly, transistors 22a and 22b in conjunction with a series resistor 180 form a potentiometer network which preferably varies the gain going into emitter follower amplifier 23. This signal preferably goes through the emitter follower 23 and is then provided in parallel along two paths 182 and 184. Path 182 preferably provides this signal to a conventional electronic switch 24 which preferably acts as a gate circuit comprising a transistor arranged as a shorting gate, this switch 24 preferably receiving a pulse input. This gate circuit 24 preferably acts as the burst flag circuit, the transistor preferably shorting out everything except the color burst while allowing the color burst to pass through to a conventional amplifier circuit 25 which is an amplification circuit which preferably amplifies the burst only and rectifiers it into a DC voltage. This rectified DC voltage is preferably utilized as the DC control voltage for amplifier 22 to control the gain thereof. The level of the color burst signal is preferably always in direction proportion to the level of chroma and, accordingly, utilizing the color burst as the reference for preferably determining the gain or level of chroma produces a very accurate result.

The output of emitter follower 23 is also preferably fed in parallel to a conventional phase splitter 20 via path 200, phase splitter 29 having an inverting output via path 202 and a non-inverting output via path 204. The inverting output 202 of phase splitter 29 is preferably fed through a capacitor 206 and the non-inverting output 204 is preferably fed into a conventional FET 208 which is used as a voltage variable resistor, FET 208 and capacitor 206 preferably comprising the electronic phase splitter 30 which enables the phase of the subcarrier signal to be preferably varied by approximately 90 degrees, which, in conjunction with potentiometer 210 provides a hue control circuit. The output of this hue control circuit 30-210 is preferably fed into a conventional phase locked loop 31 which preferably has an electronic gate 212 comprising a pair of transistors 212a and 212b which preferably function to short the input of the phase locked loop 31 whenever there is no chrominance signal by letting the phase locked loop 31 free run at its crystal controlled frequency which is preferably the 3.58 megahertz color subcarrier frequency, thereby facilitating the ability to make the black burst signal which is created when a color input is not present. Thus, transistor gating circuit 212 preferably functions to short the input of the phase locked loop 31 to create a clear wave subcarrier at 3.58 megacycles without the presence of any spurious signals. When, however, there is a chrominance signal present, gate 212 is preferably inoperative and the signal passes directly to the phase locked loop 31 via path 214 and synchronizies it. The outputs of the phase locked loop 31 is then preferably fed through a conventional filter circuit 32 which is preferably a conventional series tuned resonance circuit which produces a clear sine wave which is then preferably fed through a burst level potentiometer 216 for providing the pure subcarrier signal from which the burst is made to one input 218 of a conventional two input electronic switch 34, such as a Motorola MC 1445. The other input 220 of the electronic switch 34 is preferably the chroma signal which is provided directly from emitter follower 23 via path 184 through a chroma gain potentiometer 222 and a chroma level potentiometer 224, with potentiometer 224 preferably being ganged to potentiometer 144. As shown and preferred, the chroma signal is preferably shorted out during the blanking interval via a conventional gate or electronic switch 33 so that if any interference signals are present, they will be blanked out during blanking. Thus, gate 33 is a transistor gate that preferably blanks all chroma that would occur during the blanking interval. The switching pulse for the electronic switch 34 is preferably the burst flag provided via path 230. The burst flag pulse is preferably first fed through a conventional R-L-C filter 28 comprising resistor 232, inductor 234 and capacitor 236, which preferably "rounds off" the edges of the burst flag pulse in order to provide a smooth transition of the sides of the burst flag and gives it the ideal EIA characteristics of slow rise and fall. The burst flag pulse forces the electronic switch 34 to provide the clear wave reconstituted or reconstructed subcarrier signal only during the presence of burst flag, while providing the chroma signal at all other times. Since the chroma has been blanked out during the blanking interval, reconstituted burst and automatic gain controlled chroma signal are present at the output of switch 34, which output signal is preferably provided via path 240 and is DC balanced and then fed up to the resistor which mixes it at the emitter follower output stage 21.

Now describing the provision of the synchronizing, blanking, burst flag and window signals in the preferred processing amplifier 100 of the present invention, the output of emitter follower 8 is preferably provided to a conventional sync separator 47, such as a Motorola MC 1334 via path 250, the video signal at the emitter of transistor 8 preferably having all high frequency components rolled off to preferably provide a video signal with a high frequency characteristic, by way of example, of about 500 KHZ to 1 MHz. Accordingly, all high frequencies have preferably been chopped off thereby cleansing the video signal of noise. This video signal provided via path 250 is preferably fed into the conventional sync separator 47 which preferably has its own conventional noise cancellation circuitry to take care of any further, deeper noise which may be present. The output of the sync separator 47 is preferably fed into a conventional integrator 53 which preferably comprises a conventional saturated amplifier and horizontal frequency component filter which, after all the horizontal frequency components have been filtered off the vertical pulse, reestablishes the vertical pulse shape. The output of integrator 53, which preferably consists of a vertical pulse, is preferably fed into a conventional one-shot multivibrator 54 which is preferably used as a pulse filter by utilizing the characteristic of a one-shot that it has a time period of one frame and will, thus, only trigger after it has gone through a total frame of delay. Thus, any other sync or noise pulses that are provided to the one-shot 54 cannot trigger the one-shot 54 until it has gone through its whole cycle. One-shot 54, therefore, provides a pulse filter that removes any extra pulses that might be mistaken for a vertical sync pulse. This pulse filter 54 will preferably only permit a vertical sync pulse to pass through it because only a vertical sync pulse will be in the exact proper position of it to pass through, whereas random noise pulses will be in the wrong position and will not be able to trigger this one-shot 45 before it has finished its cycle. Thus, one-shot 54 provides a unique one-shot pulse filter whose output is a vertical sync pulse that is practically noise immune.

This vertical sync pulse output of pulse filter 54 is preferably fed into a conventional vertical phase locked loop 55 for further signal conditioning since there is still a possibility that the vertical sync pulse could be absent from the video signal. By providing the vertical sync pulse output of pulse filter 54 to the vertical phase locked loop 55, the vertical phase locked loop 55 will always preferably be creating a vertical sync pulse and hold position even in the absence of the vertical sync pulse in the video signal. Thus, by the time the vertical sync pulse reaches the output of the vertical phase locked loop 55, it will have passed through many different stages of noise cancellation, filtering and reconstruction and pulse filtering and, thus, will constitute a vertical pulse that nis accurate in composition. This vertical pulse at the output of phase locked loop 55 is then preferably fed to a conventional NAND gate 45 which is utilized as a conventional buffer and squaring amplifier to preferably provide an output therefrom of 60Hz at 180° phase, by way of example. The output of gate 45 is, in turn, preferably provided to a second conventional NAND gate 56 which is preferably conventionally utilized as an inverter to provide an output therefrom of 60Hz at 0° phase. These two outputs of gates 45 and 56, respectively, are preferably connected to the two poles 62a and 62b, respectively, of a conventional two pole switch 62, which is termed the cross-pulse switch 62. The cross-pulse output signal from switch 62 is then utilized as a trigger signal for a conventional front porch one-shot 57, a conventional vertical blanking one-shot 64 and a conventional vertical equalizing width one-shot 67 by connection in parallel to the inputs thereof. The above mentioned one-shots 57, 64 and 67 will either preferably trigger on the leading edge or the trailing edge of the aforementioned 60Hz square wave dependent on the position of cross pulse switch 62 thereby producing either a 0° phase shift, or a 180° phase shift of the input vertical sync signal with respect to the output vertical sync signal. This will enable the observation of the vertical sync interval, if desired, on a conventional TV monitor connected to the output of the preferred processing amplifier 100. As was previously mentioned, it is this triggered vertical blanking one-shot 64 which, in turn, triggers the circuitry 65-66-51 which is responsible for providing the aforementioned vertical window.

Now considering the horizontal signal circuitry, the preferred video processing amplifier 100 preferably includes a conventional horizontal phase locked loop circuit 41 which is preferably connected to the aforementioned sync separator 47 through a conventional differentiator 40 to receive the horizontal signal therefrom. As previously mentioned, this horizontal signal undergoes noise inversion in sync separator circuit 47. The horizontal phase locked loop 41 is preferably operating at twice the horizontal frequency, with the output thereof preferably continuing to provide a 31.5 KHz signal, by way of example, even in the absence of horizontal sync in the video signal. This horizontal phase locked loop 41 output is preferably fed, in turn, to a conventional flip-flop 68 which divides this 31.5 KHz square wave by 2, preferably producing a 15.750 KHz square wave, by way of example, for triggering a conventional horizontal blanking one-shot multivibrator 49 for the creation of the horizontal blanking signal.

In addition, the aforementioned signal path to flip-flop 68, which is the clock pulse, is preferably provided in parallel along two other signal paths. In one of these other signal paths, the clock pulse output of phase locked loop 41 is provided to a conventional horizontal front porch one-shot 43. The output of this front porch one-shot 43 is preferably provided as a trigger input to one input of a two input conventional horizontal sync one-shot circuit 44 which thereby creates horizontal sync at preferably twice the horizontal frequency at a repetition rate of, by way of example, 31.5 KHz. The positive output of the horizontal blanking one-shot 49 is preferably fed into the other AND input of the horizontal sync one-shot 44 with this signal thereby cancelling out every other 31.5 KHz trigger pulse provided to horizontal sync one-shot 44 from the front porch one-shot circuit 43. Thus, the output of the horizontal sync one-shot circuit 44 is preferably at the aforementioned 15.700 KHz rate. This output, which is provided from the horizontal sync one-shot 44, is then preferably fed to the J input of a conventional divide-by-two J-K flip-flop 48 as a reset pulse in order to preferably establish the same starting point in flip-flop 48 every time. The outputs of flip-flop 48 provided via paths 48a and 48b are preferably fed to the two poles 63a and 63b of another conventional two-pole 63 cross-pulse switch 63 through a resistor and capacitor network which conventionally develops a ramp for the phase locked loop 41 output signal to provide a ramp pulse signal. Preferably as cross-pulse switch 63 is switched, this ramp changes its polarity and the phase locked loop 41 locks up either in phase or 180° out-of-phase with the incoming sync signal which is preferably being provided to the phase locked loop 41. Thus, the aforementioned flip-flop 68 is preferably utilized as a non-resettable or non-reset flip-flop that generates the horizontal blanking pulses and, accordingly, establishes a starting point in phase relationship so that the horizontal sync that is provided at the output of video processing amplifier 100 will preferably always be in coincidence with the horizontal blanking. Flip-flop 48, however, allows phase shifting for cross-pulse purposes and is reset in accordance with the coincidence between the horizontal blanking and horizontal sync, flip-flop 48 receiving one input along the remaining output signal path from phase locked loop 41 through a conventional inverter 42. This interconnection of signals between these two flip-flops 48 and 68 preferably insures that all of the flip-flops will always be in the correct mode and correctly reset every time the video processing amplifier 100 of the present invention is turned on. If such an arrangement were not utilized, and only one flip-flop was utilized in lieu thereof, then the cross-pulse switch 63 would have to be switched in different directions at various times in order to observe cross-pulse and the proper pulse display could not be insured for a given position of the switch 63. However, with the two aforementioned flip-flop circuits 48 and 68 interconnected together in the aforementioned preferred feedback arrangement, they will always preferably be reset in the proper phase each time the video processing amplifier 100 is turned on.

Since the equalizing pulses and the serration of vertical sync is preferably accomplished by the combination of pulses occurring at the vertical rate and at the horizontal rate, the conventional one-shot 35, which controls the horizontal timing, is termed the horizontal equalizing pulse one-shot 35 and the conventional one-shot 67 which controls the vertical timing is termed the vertical equalizing pulse one-shot 67. Preferably these two conventional one-shots 35 and 67 are ANDED together and, accordingly, overlap to produce the aforementioned equalizing pulses. Referring to one-shot 35, it is preferably triggered by the output of the aforementioned front porch one-shot circuit 43. As previously mentioned, the output of the front porch one-shot 43 is preferably at a 31.5 KHz repetition rate and, therefore, it will preferably trigger the horizontal equalizing pulse one-shot circuit 35 twice each line, with the duration of this one-shot being approximately 2.5 microseconds, in the example given, in order to provide the horizontal equalizing pulse width observable on a conventional cross-pulse display monitor. The other AND input to the horizontal equalizing pulse one-shot 35 preferably is provided from the vertical equalizing one-shot 67 which controls the height of the resultant hammer head (FIG. 3B) displayable on a conventional cross-pulse display monitor. Thus, the output of the horizontal equalizing pulse one-shot circuit 35 preferably consists only of the hammer head as observable on such a cross-pulse display monitor. This hammer head signal is, in turn, preferably fed to a conventional two input AND gate circuit 52 as one input thereof. The output of the horizontal sync one-shot circuit 44 and the output of the vertical equalizing one-shot circuit 67 are preferably mixed together in a conventional NAND gate circuit 59, which results in the height of the equalizing pulses being "slit out" of the horizontal sync with a "slit" in the horizontal sync being such as seen on the cross-pulse display (FIG. 3B) located as illustratively shown in FIG. 3B in the horizontal sync pulse and being the same height as the hammer head. This signal is then preferably fed to the other input of AND gate circuit 52 whose other input, as previously mentioned, is the hammer head signal. When these two signals are ANDED together in AND gate 52, both the hammer head and the horizontal sync are provided at the output thereof, which output is preferably fed to another conventional AND gate circuit 46 which ultimately provides the sync via path 240 after ANDing with the serrated vertical sync.

In order to provide the aforementioned serrated vertical sync, which is the other output to AND gate 46, the following preferably occurs. The vertical front porch one-shot 57 is fed from the cross-pulse switch 62 as previously mentioned. The output of the vertical front porch one-shot 57 is preferably fed, in turn, to a conventional vertical sync one-shot circuit 60 whose output is one of the inputs to a conventional two input NAND gate circuit 61. The other input to NAND gate 61 is preferably fed from a conventional serration one-shot 36 which is preferably triggered by the output of the horizontal front porch one-shot 43 so that the serration pulse preferably starts at the same time that horizontal sync starts. However, the serration pulse preferably lasts for a much longer period of time, such as approximately 26.5 microseconds in the example given, and the remaining approximately 6 microseconds, in the example given, is the actual vertical serration interval. The output of the serration one-shot 36 is then preferably fed into the other input of NAND gate 61 and, accordingly, the vertical sync pulse is preferably serrated in that area of 6 microseconds at twice the horizontal frequency, so that the output of NAND gate 61 is the preferred serrated vertical sync pulse which is then, as previously mentioned, preferably, fed to AND gate 46 to complete the construction or reconstruction of the composite sync.

With respect to the provision of composite blanking in the video processing amplifier 100 of the present invention, this is preferably accomplished by conventionally ANDING the vertical blanking output of conventional one-shot 64 with the horizontal blanking output of conventional one-shot 49 in conventional AND gate 58. The output of AND gate 58 is the composite blanking signal.

Lastly, the burst flag is preferably provided in the video processing amplifier 100 of the present invention by feeding the output of conventional NAND gate 59, which is the horizontal sync having 9 lines missing in the equalizing area, to conventional one-shot 39 which preferably sets the color burst position and, therefrom, to conventional one-shot 38 which controls the color burst pulse width. The output of one-shot 38 is, in turn, preferably fed to electronic switches 7 and 9 as the burst flag, and through conventional burst pulse filter 28 to electronic switches 24 and 34.

OPERATIONAL SUMMARY

Automatic black level restoration in accordance with the present invention comprises two basic processes, namely the creation of window signals and a gated diode DC restoration circuit active during active picture video interval.

The back porch of the horizontal blanking pulse has been traditionally used as the reference for the blackest portion of the video signal, for example, in video processing equipment, black level has traditionally been referenced at this point, and a black level manual control is provided for any manual corrections. Such a system was satisfactory when video processing amplifiers were predominantly used with broadcast quality equipment. However, since the wide spread of inexpensive vidicon portable video tape recorders, such previous systems are no longer sufficient to correct the gross black level distortions present in such equipment. Vidicons have a characteristic known as dark current, which means that the darker the scene, the higher the black level will be due to this dark current leakage. This is the opposite to the proper relationship in which the darker the scene the lower the black level. Thus, prior art video processing equipment merely follows the black level distortions and gives the user the manual opportunity to correct the black level by hand. On signals that have rapid changes this becomes very difficult to do. The present invention overcomes this problem, with the previously described preferred circuit which finds what is truly black in the picture signal and uses that, instead of the prior art use of the back porch.

Automatic black level restoration occurs in the following manner. When a signal is passed through a capacitor that has its output side connected to the cathode of a diode, the most negative transition of that signal will cause the diode to conduct and establish that point at (in this case) ground level and the rest of the signal will rise above the point in the positive voltage direction. This comprises a very simple DC restorer circuit. The lowest transition in most video waveforms corresponds to black, particularly when most of the scene is black. Thus, to re-establish a true black level in a video signal that has a distorted black level, one could try to send it through a simple DC restorer. However, a video signal does not just consist of the picture information signal, it also contains the blanking signal, which is blacker than the blackest part of the picture signal, and it contains the sync signal which is still blacker than the blanking signal. Thus, a simple DC restorer is not sufficient since it is preferred that the diode DC restorer operate only during the picture portion of the video signal and not clamp on the blanking or the sync signals. If the DC restorer is clamped to the blanking signal, then you would wind up with the same distortion that was originally there. If it is clamped to the sync signal, it would cause an even greater inaccuracy. Thus, the DC restorer is preferably only gated on during the active picture area. Moreover, in order to insure that there is absolutely no chance that the DC restorer will ever use one of the porches of blanking as a reference of black, "window signals" are created in the present invention which chop out the middle active area of the picture signal, these "window signals" being similar to blanking signals except that all the porches are wider creating the aforementioned guard bands. These "window signals" are used to gate "on" the DC restorer only during the active picture interval, the DC restorer then clamping to the most negative portion of the picture signal at that time, which corresponds to the blackest thing in the picture.

The creation of the "window signals" occurs as follows. Since all signals associated with timing are preferably created by the use of one shot multivibrators in the present invention, the aforementioned "window signals" are preferably created by using the trailing edge of the vertical and horizontal blanking one shots to trigger the first one shot which provides means for adjusting the aforementioned guard bands, the output of this one shot being used to trigger another one shot which determines the size of the "window." This process is used for both line and frame modes and with these signals then being added together to form the composite "window signal." This composite "window signal" is used to gate "on" the gated diode DC restoration circuit which then operates as follows. The composite video signal is then passed through a capacitor of the proper size (fed through a low impedance emitter follower) to two diodes connected back-to-back. The top diode which is preferably a transistor used to achieve greater conduction is the DC restoration diode and its cathode is connected (in the preferred configuration illustrated herein), the opposite configuration being used with an inverted video signal, to the feed capacitor. Its anode is connected to the anode of another diode and the cathode of that other diode is preferably connected to ground. When a positive window signal is applied to the junction of the respective anodes of these two diodes, both diodes are brought into conduction with the bottom diode shorting thereby connecting the anode of the upper diode to +0.6 or almost ground level, thereby enabling it to function as a gated DC restorer during the duration of the active picture.

Now describing white-peak referenced video limiting. Many video processing amplifiers employ some means of keeping the video signal at the proper level. Thus, the prior art comprises a manual potentiometer with video automatic gain control (AGC) which rectifies the peak-to-peak transition of the composite video signal and makes it into a DC controlled signal which is then normally provided to a field effect transistor which comprises one of the legs of an electronic potentiometer controlling the input level of the amplifier. However, with the wide spread use of inexpensive portable video tape recorders in conjunction with vidicons this prior art approach does not give an accurate video level primarily because of two factors which work in conjunction with each other to create gross distortions in the video signal. Most portable video tape recorders have an internal video AGC. A camera is then externally connected to the recorder which contains a stable sync pulse level, with a highly distorted video signal due to the use of an automatic target which increases the target voltage on the vidicon as the light level goes down and brings down the target voltage when the light level rises, a delay being provided in this response. The following occurs. For a very bright scene the video level goes high thereby causing the video AGC in the video tape recorder to cut down the video level going into it, thus causing the ultimate video signal to have a higher video-to-sync ratio since the sync is getting smaller. The automatic target control then takes effect after some time, cutting the video level of the camera down, thus causing the video AGC control in the recorder to increase its input level to compensate for this. The video-to-sync ratio is then changed thereby causing the sync level to rise. The camera is then pointed to a very dark scene which then causes AGC in the video recorder to compensate by greatly increasing its gain, thereby increasing the video-to-sync ratio more in favor of the sync which, in turn, causes a very high sync level to be present with a low video or noise level. The automatic target control then increases the voltage on the target of the vidicon in an attempt to increase the sensitivity of the camera. This, in turn, causes a corresponding rise in dark current which the video AGC in the video tape recorder interprets as an increase in video level and, accordingly, brings its gain down thus again causing a decrease in sync and video level. Thus, prior art systems of the type described above which use the peak-to-peak level of a video signal as the reference in controlling video level are not satisfactory.

In accordance with the present invention, the video signal is first provided via a DC controlled video amplifier, such as a Fairchild double balanced video amplifier, and is then either clamped to the back porch of the horizontal blanking signal or, most preferably, is passed through the aforementioned automatic black level restoration circuit. This provides a video signal with the true black level, however, the peak white level still needs to be corrected. This signal comes out of emitter follower 12 with black corresponding to "0" volts DC and white corresponding to about +0.6 volts above that. The sync pulses are always below ground at the output of emitter follower 12. At this point, a resistor feeds the base of NPN transistor 14. Since the forward conduction voltage for the transistor to saturate is the aforementioned +0.6 volts, any time the video signal reaches this point it will feed current pulses into its following circuit 14 causing a corresponding build up in voltage at circuit 16 which DC controls the gain of the input amplifier, thus referencing the video level to the true white peak in the video signal, always bringing the gain down rather than up. If the user desires to bring the gain up, this may be accomplished by means of the video limit potentiometer; however, the white peak referenced video limiting circuit will never allow the operator to bring the level too high since a predetermined point in the rotation of the video limit control no further increase in video level will occur.

Since high dark current can make a video signal appear as if it is of high amplitude, in prior art systems the full contrast cannot be obtained using conventional techniques. However, in the present invention, the black level is corrected first before the video amplitude is used to control the video limiter. Thus, instead of rectifying the peak-to-peak amplitude of the video signal for providing the DC control voltage, the smallest peak white spike is used, thereby insuring that the video level is determined by the brightest object in the picture even if it is a very small area, whereas with conventional peak-to-peak rectification, a change in the area of white will cause a change in the DC control voltage, thereby bringing down the contrast in high contrast scenes. In addition, since the sync level is not used at all in the control of limiting level, any variations in sync level will not have any influence on the video limiting performance of the system. Moreover, since video limiting is employed instead of video AGC, there will be no rise in video level if the video level falls below what it is supposed to be, thereby insuring the integrity of video fades to black and scenes that are supposed to intentionally be low contrast.

Now describing the image enhancement aspect of the present invention. Prior art video processing amplifiers concern themselves with the correction of the sync signals, blanking signals, manual black level correction, and control of video gain and color processing. Other video processes are left for other pieces of hardware, which, however, duplicate similar circuitry that is normally found in the video processing aplifier, thus causing the use of many more components with more chance of breakdowns, more equipment to be set up, more complicated operation, more power consumption, and much more expense. The present invention, however, goes beyond the present functions of conventional video processing amplifiers, such as by incorporating the function of image enhancement into the preferred video processing amplifier of the present invention thus providing for control of picture clarity or sharpness. It is known that to make a video picture sharper you have to boost the gain at high frequencies; however, by doing this you cause a phase shift that manifests itself as an edge at one side of objects which causes an undesirable visual effect. It was discovered, previously, however that when television stations used image orthicon TV cameras they seemed to obtain very sharp pictures, when in fact the resolution was quite poor. This effect was caused by the characteristics of the image orthicon tube which gives a dark edge around bright objects which, in turn, makes the picture appear sharper. The present invention accomplishes a similar effect without use of an image orthicon by employing a transistor amplifier which amplifies the high frequency component of the video signal, inverts it and feeds it back on the other side of a feeding coil 142, thus causing a slight delay in the video signal so that when inverted high frequency components are added they "ring" before and after the edges of objects in the picture, such that a black bar would have a white edge before and after it. By varying the values of the various components, any desired results can be achieved. Prior art image enhancers employ hundreds of transistors as opposed to this single transistor amplifier, modulating up, delaying then modulating down again in order to achieve the same visual effect as the preferred image enhancer single transistor circuit does.

In order to provide genlocked sync regeneration, the video processing amplifier 100 of the present invention provides vertical and horizontal drive outputs so that external video equipment, such as cameras or video titlers, can be driven off the corrected reconstituted sync and blanking pulses (60 and 44), that are derived from the signal fed into the video processing amplifier 100. In addition, video processing amplifier 100 provides subcarrier regeneration. Thus, at the top of the burst potentiometer 216, a clear sine wave signal is present which is exactly locked to the burst of the incoming color video signal. When this signal is provided as an output through an emitter follower circuit, it constitutes a regenerated subcarrier signal for locking additional color video equipment to the signal fed into the input of the video processing amplifier 100.

The amplifier 100 of the present invention also incorporates non-additive video mixing. Thus, while video tape signals are being processed and edited, titles or other special effects can be added without the need of a switcher-fader, or video mixer. In order to accomplish this, processing amplifier 100 has two fader potentiometers, one allowing the main signal being fed into the processing amplifier 100 to be faded to black without disturbing sync or blanking, this potentiometer being called FADE 144 and the other potentiometer 136 being celled TITLE since the other non-additive input of the video mixer is predominantly used for this function. Mixing is accomplished by tying the emitters of emitter follower type circuits together thereby providing a differential mix circuit 17a–17b, the emitters of this circuit being connected to another transistor 17c of the opposite type in order to cancel out any DC shifts due to temperature changes, thereby causing absolute temperature stability where it critical.

Processing amplifier 100 also incorporates a phase locked loop circuit 31 which is temperature compensated and crystal controlled to free run at the color subcarrier frequency of 3.58 mHz. even when no color input is presented to the processing amplifier 100. It is therefore possible to add color burst to a monochrome signal being processed by switching the burst on. Similarly, by turning the fade potentiometer down, black burst can be obtained. This function is preferably used when interediting between color and monochrome signals to be added together in the same edited tape.

The processing amplifier 100 of the present invention also preferably employs an unconventional system for reconstruction of the vertical sync pulse. After video has passed through white peak referenced video limiting, it is fed to an integrated circuit sync separater chip, such as Motorola MC1344. The noise inverted separated composite sync is then fed to integrater circuit 53 for removal of the horizontal sync pulses. The signal is then fed to a saturated amplifier circuit 53 to reestablish its amplitude and to shape it into a vertical sync pulse. This process eliminates very short duration pulses, however, drop out will get through this circuit and appear as an extra sync pulse. Thus, this integrated vertical sync pulse is then fed into another circuit that will only allow vertical sync pulses to come through exactly where they are supposed to be. A non-retriggerable one shot multivibrator which holds its state for an entire vertical field is preferably used for this purpose, such as an NE555. The sync pulse is fed into the trigger input of the NE555 one shot, the time constants for this one shot being chosen to hold for a duration of approximately one vertical frame. Any extra vertical sync, or noise pulses, will not get through since this is one shot is a non-retriggerable one shot and will not trigger until it has gone through a cycle. The output of this one shot is a short duration pulse about the same pulse width as the original vertical sync. However, although this circuit will make sure that extra vertical sync pulses will not be present, it still cannot fill in for missing vertical sync pulses. To deal with this situation another circuit is employed, termed the vertical phase locked loop circuit 55. This circuit 55 has an oscillator which preferably maintains an exact frequency of 60 cycles, which is DC controlled by the output of a phase comparator through a slow time constant circuit, the input of the phase comparator consisting of two signals, the first being the filtered sync pulse and the second being the output of the oscillator on the phase locked loop chip. Together these two timing signals produce a DC correction voltage that keeps the oscillator in the proper phase. If, however, the vertical sync pulse should disappear, the oscillator on the chip will maintain the proper phase output for at least one second due to the long time constant of the DC fed to it, which will then remember the last DC voltage and hold it until a new correction voltage starts up again.

The vertical phase locked loop 55 characteristics are preferably such that when the incoming vertical sync pulses change position, as what might happen when playing a video tape with different segments, the vertical phase locked loop will slowly shift the outgoing vertical sync pulse to its new position. The purpose for this is so that the servos in the editing machine do not lose lock and go through an entire cycle before establishing lock, which is important during video editing.

Other features of the preferred processing amplifier 100 enable the provision of a cross-pulse display, a peak white test signal, and an EIA-RS170 sync format output. Thus, since the outputs of both the horizontal and vertical phase locked loops are square waves, by inverting them through a NAND gate 56 and 48, a flip-flop and the sync and timing one shot circuits 54, 55, 56, 59, 61, 45, 46, 58, 52, 68, 48, 41, 57, 60, 65, 66, 67, 51, 50, 49, 36, 35, 44, 43, 39 and 38 are caused to trigger in the middle of the frame and middle of the line so that the sync and blanking waveforms of the incoming video signal will be observable on the screen of a monitor connected to the output of the processing amplifier 100 to provide a cross-pulse display. Similarly, by feeding the plus pulse of the output of window one shot 51 to a switch that connects to one of the non-additive video mixed inputs 152, a peak white test signal can be obtained which allows the edges of the incoming video signal to be seen simultaneously on an oscilloscope display for ease of set up of the video limit control and ease of set up of the editing recorder's video level control. Lastly, by using the preferred amplifier 100 of the present invention, any video signal that can hold on a regular home television set or industrial television monitor can readily be connected to the EIA RS170 composite signal format.

By utilizing the preferred video processing amplifier of the present invention, automatic black level restoration is provided for correcting any black level distortion in video tapes being processed, one-shot multivibrator pulse filtering is provided, image enhancement is readily provided as well as numerous other advantages over the prior art which will readily occur to one of ordinary skill in the art.

It is to be understood that the above described embodiment of the invention is merely illustrative of the principles thereof and that numerous modifications and embodiments of the invention may be derived within the spirit and scope thereof.

What is claimed is:

1. In a video processing amplifier having means for receiving a composite video signal input having predetermined video signal characteristics including black level composite sync and composite blanking signals, and means for correcting for any black level distortion present in said composite video signal input for restoring said black level to a substantially undistorted video signal black level, said composite sync signals comprising horizontal and vertical sync and said composite blanking signal comprising horizontal and vertical blanking signals; wherein the improvement comprises means operatively connected between said composite video input signal receiving means and said black level restoration means for removing said sync and blanking signals from said composite video signal input prior to said black level distortion correction and restoration; and said black level distortion correction and restoration means comprises means for providing a window signal positionable in a central area of the associated video picture produceable from said composite video signal input, said window signal having an associated width greater than an associated width of said vertical blanking signal and an associated width of said horizontal blanking signal by a predetermined amount, said predetermined amount providing a guard band about said window signal for preventing said video processing amplifier from black level sampling of any portion of said composite blanking signal, said window signal comprising a window pulse having an associated positive polarity, and keyed clamp DC restoration means operatively connected to said window signal providing means for receiving said window pulse positive polarity and for keying said keyed clamp DC restoration means on during said central area of said associated video picture information while said positive polarity of said window pulse is present for sampling said composite video signal input and clamping the blackest negative excursions of said composite video signal input to a predetermined positve voltage level, whereby said processing amplifier provides an output composite video signal having said black level restoration.

2. An improved video processing amplifier in accordance with claim 1, wherein said window signal providing means comprises a one-shot means for determining the vertical height of said positionable window signal, said vertical height one-shot means comprising a first diode means operatively connected to said keyed clamp DC restoration means for being keyed into conduction during said central area of said associated video picture information while said positive polarity of said window pulse is present, said keyed clamp DC restoration means comprising a second diode means operatively connected to said first diode means at a common junction in a keyed clamp configuration for keying said first and second diode means into conduction when said positive polarity of said window pulse is provided to said common junction, for clamping said blackest negative excursions of said composite video signal input to said predetermined positive level.

3. An improved video processing amplifier in accordance with claim 2, wherein said first and second diode means each comprise equivalent anode and cathode means and said first and second diode means equivalent anode means are operatively connected back-to-back in said keyed clamp configuration with said composite video signal input being provided to said second diode means equivalent cathode means.

4. An improved video processing amplifier in accordance with claim 2, wherein said window signal providing means further comprises a vertical blanking one-shot means and a vertical position one-shot means, said vertical blanking one-shot means being operatively connected between said composite video signal input receiving means and said vertical position one-shot means for triggering said vertical position one-shot means on the trailing edge of said vertical blanking signal, said vertical position one-shot means being operatively connected to said vertical height one-shot means for triggering said vertical height one-shot means for determining said vertical height of said positionable window signal.

5. An improved video processing amplifier in accordance with claim 4, wherein said window signal providing means further comprises a horizontal blanking one-shot means, a horizontal position one-shot means and a horizontal width one-shot means, said horizontal blanking one-shot means being operatively connected between said composite video signal input receiving means and said horizontal position one-shot means for triggering said horizontal position one-shot means on the trailing edge of said horizontal blanking signal, said horizontal position one-shot means being operatively connected to said horizontal width one-shot means for triggering said horizontal width one-shot means for determining said horizontal width of said positionable window signal.

6. An improved video processing amplifier in accordance with claim 5, wherein said vertical height one-shot means output is further operatively connected to the input of said horizontal width one-shot means for anding said vertical height one-shot means output with said horizontal width one-shot means output for providing said positionable window signal as a rectangular positionable window signal in said central area.

7. An improved video processing amplifier in accordance with claim 1, further comprising peak-white video limiting means operatively connected between said keyed clamp DC restoration means output and said composite video signal input receiving means for providing peak-white detection and video limiting of said composite video signal input at a predetermined video limit potential.

8. An improved video processing amplifier in accordance with claim 1, further comprising video image enhancement means operatively connected to said keyed clamp, DC restoration means output and responsive to the presence of a black bar in said picture for providing a white ring both before and after said black bar each time said black bar is present in said picture, whereby said black bar comprises an origination signal whose image is enhanced.

9. An improved video processing amplifier in accordance with claim 8, wherein said video image enhancement means comprises a unitary transistor means, a resistive-inductance means operatively connected to said transistor means output for providing a high impedance to high frequency components of said composite video signal input at said transistor means output and feedback potentiometer means operatively connected between said resistance-inductance means output and said transistor means input for adding said high frequency components to said composite video signal input for providing said white ring.

10. An improved video processing amplifier in accordance with claim 8, further comprising non-additive video mixing means operatively connected to said video image enhancement means output, said non-additive video mixing means comprising a non-additive differential mixing first type transistor stage operatively connected to an opposite second type transistor stage for providing absolute temperature stability for said non-additive video mixing means.

11. An improved video processing amplifier in accordance with claim 10, wherein said first type transistor stage comprises a pair of NPN type transistors and said second type transistor stage comprises a PNP type transistor.

12. An improved video processing amplifier in accordance with claim 10, further comprising video signal fading means operatively connected between said video image enhancement means output and one input of said non-additive differential mixing stage, and title camera input signal means operatively connected to another input of said non-additive differential mixing stage for non-additively mixing predetermined video title information with said video image enhanced restored video signal in said ouput composite video signal.

13. An improved video processing amplifier in accordance with claim 8, further comprising a video blanking mixer means operatively connected to said video image enhancement means output for adding new composite blanking to said video image enhanced restored video signal for providing said output composite video signal.

14. An improved video processing amplifier in accordance with claim 13, further comprising a common peak level clipping means operatively connected to said video blanking mixer means output for clipping both the black and white levels in said output composite video signal, said common peak-level clipping means comprising a common clipping amplifier means having an associated predetermined saturation characteristic above which said output composite video signal is black and white saturated, said common clipping amplifier means setting the upper and lower limits of said output composite video signal.

15. An improved video processing amplifier in accordance with claim 14, wherein said common clipping amplifier means comprises a transistor amplifier means having a base, a collector and an emitter, with said black and white clipping being achieved by said saturation characteristics of said transistor amplifier means from said collector to said emitter.

* * * * *